W. J. STEINLE.
TUBING APPARATUS.
APPLICATION FILED APR. 21, 1915.
1,320,718.
Patented Nov. 4, 1919.
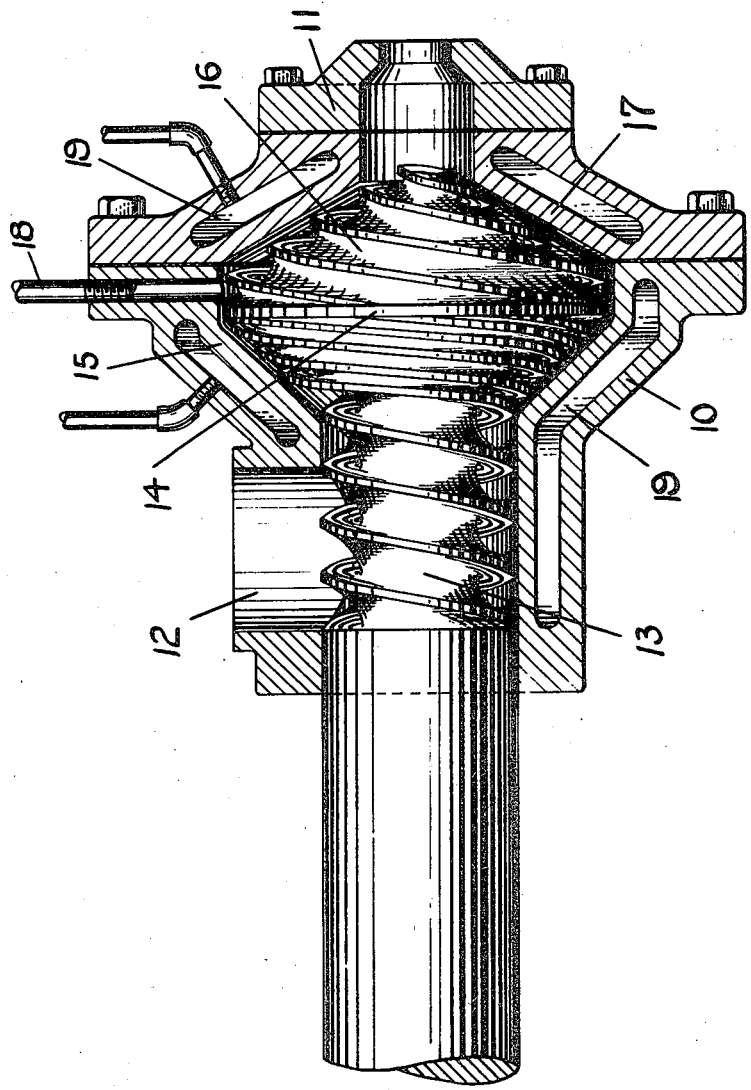
WITNESS:
INVENTOR
William J. Steinle.
BY
HIS ATTORNEY

UNITED STATES PATENT OFFICE.

WILLIAM J. STEINLE, OF ELMHURST HEIGHTS, NEW YORK, ASSIGNOR TO RUBBER REGENERATING COMPANY, A CORPORATION OF INDIANA.

TUBING APPARATUS.

1,320,718.  Specification of Letters Patent.  Patented Nov. 4, 1919.

Application filed April 21, 1915. Serial No. 22,892.

*To all whom it may concern:*

Be it known that I, WILLIAM J. STEINLE, a citizen of the United States, residing at Elmhurst Heights, Long Island, county of Queens, State of New York, have invented certain new and useful Improvements in Tubing Apparatus, of which the following is a full, clear, and exact description.

The invention consists in certain novel details of construction and combinations of parts hereinafter more fully described and claimed, it being understood that various modifications may be resorted to within the scope of the appended claims.

An apparatus suitable for carrying out the invention is shown in the accompanying drawing, in which:

The figure is a cross-sectional view through the apparatus.

Referring now to the drawing, I have illustrated an apparatus used in treating rubber, more particularly an apparatus of that type known as tubing machines wherein the rubber is advanced longitudinally through the machine by a feed screw and is thereby forced through a die at the discharge end of the machine in a compact shaped ribbon-like mass.

In the apparatus shown, 10 designates a casing and 11 a die at the discharge end of the casing, the material being fed into the machine through a hopper 12 and being carried from the hopper by a feed screw 13 which advances the material longitudinally through the casing and ejects it in a compact mass through the die.

In carrying out the invention, I preferably provide the feed screw with a collar 14 which is of larger diameter than the feed screw and I provide a substantially rigid abutment or shoulder 15 in the casing in advance of the collar, the material being compacted in the space between the collar 14 and shoulder 15 with a resultant forcing of the material by the shoulder to exert a pressure forwardly against the collar. The amount of such pressure can of course be controlled by regulating the area ratio which the collar and shoulder bear to each other.

In the present embodiment I have shown the shoulder to be conical in contour and the collar to be of like configuration, and I have also shown the pitch of the feed screw as diminishing as it progresses upon the collar from the feed end of the machine, but these details may be varied as desired without sacrificing any of the advantages or departing from the spirit of the invention. The advantage of the dimininshing pitch of the feed screw referred to is that it assists or hastens the crowding of the material in the space between the collar and shoulder.

It will furthermore be noted that in the present embodiment of the invention the feed screw on the discharge side 16 of the collar, as well as the casing 17 itself on the discharge side of the collar, are substantially symmetrical to the corresponding parts on the feed side of the collar. The pitch of the feed screw on the discharge side of the collar diminishes in the present embodiment toward the die opening, this being done for the purpose of causing a crowding of the material near the die opening, so that the material forms a seal in the casing near the die opening, which seal coacts with the seal formed by the crowded material between the shoulder 15 and collar 14 in producing a space upon the collar within which space a vacuum may be exerted upon the material as it passes over the collar.

In the present embodiment I have shown a vacuum pipe 18 as entering the casing on the discharge side of the feed screw so that the entrapped gases, fluids, and the like, which are freed as the material passes in the form of a thin film, skin, or sheet, over the collar, will be withdrawn.

I have further shown the casing to be water-jacketed as indicated at 19, in order that the temperature of the material may be controlled, but this is not necessary to the practice of my invention, it being simply necessary to the practise of the invention that an obstruction be formed upon the feed screw, against which the traveling material will be caused, by a rigid abutment or shoulder carried by the casing, to exert a pressure in the direction of travel of the material.

Having described my invention, what I claim and desire to protect by Letters Patent is:

1. A tubing apparatus comprising a casing, a feed screw therein, a collar on the feed screw of greater diameter than the feed screw, an exhaust pipe entering the casing for exhausting entrapped fluids, from the material passing over the collar, and an abutment on the casing in advance of the collar.

2. A tubing apparatus comprising a casing, a feed screw therein, a collar on the feed screw of greater diameter than the feed screw, and an abutment on the casing in advance of the collar, the material traveling on the feed screw accumulating and compacting in the space between said collar and said abutment.

Signed at New York, N. Y., this 19th day of April, 1915.

WILLIAM J. STEINLE.